Feb. 20, 1951     C. T. HAYES     2,542,138
DYNAMOELECTRIC TORQUE-TRANSMITTING APPARATUS
Filed Feb. 2, 1949     3 Sheets-Sheet 1

Charles T. Hayes,
Inventor.
Haynes and Koenig
Attorneys.

Patented Feb. 20, 1951

2,542,138

UNITED STATES PATENT OFFICE 2,542,138

DYNAMOELECTRIC TORQUE-TRANSMITTING APPARATUS

Charles T. Hayes, Kenosha, Wis., assignor to Dynamatic Corporation, Kenosha, Wis., a corporation of Delaware Application February 2, 1949, Serial No. 74,068

4 Claims. (Cl. 172—285)

1

This invention relates to dynamoelectric torque-transmitting apparatus, and with regard to certain more specific features, to a multi-rotor, eddy-current machine useful as an improved dynamometer, power transmission, or the like.

Among the several objects of the invention may be noted the provision of a torque-transmitting dynamoelectric machine by which high torque may be transmitted without employing gears of expensive forms and without unduly increasing gear tooth loading on the gears that are used; the provision of a machine of the class described having higher capacity for a given size and which may be more safely operated at higher speeds; and the provision of apparatus of this class which may be selectively loaded over a wide range without excessive loss of desirable operating characteristics. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is an end elevation, parts being broken away, of a dynamometer illustrating application of one form of the invention;

Similar reference characters indicate corresponding parts throughout the several views of the drawings.

There are known at present eddy-current dynamometers, power transmissions, slip couplings and the like in which the driving and driven field and inductor elements are co-axial. Some of these, particularly the dynamometers, employ a liquid coolant circuit and have a merely rocking (essentially stationary) driven member, an arm of which is applied to a weighing scale for the purpose of determining forces used in computing energy absorbed and torque. Others, particularly the transmissions and slip couplings, employ ambient air as a coolant and allow the driven member to rotate. In either type of

2 machine, it is desirable to have the rotary members of simple construction and of minimum diameters, so as to minimize centrifugal forces at higher speeds. It is also desirable to operate these machines according to desired characteristics over a wide capacity range. The present invention accomplishes these ends and others which will be referred to below.

Figure 1:
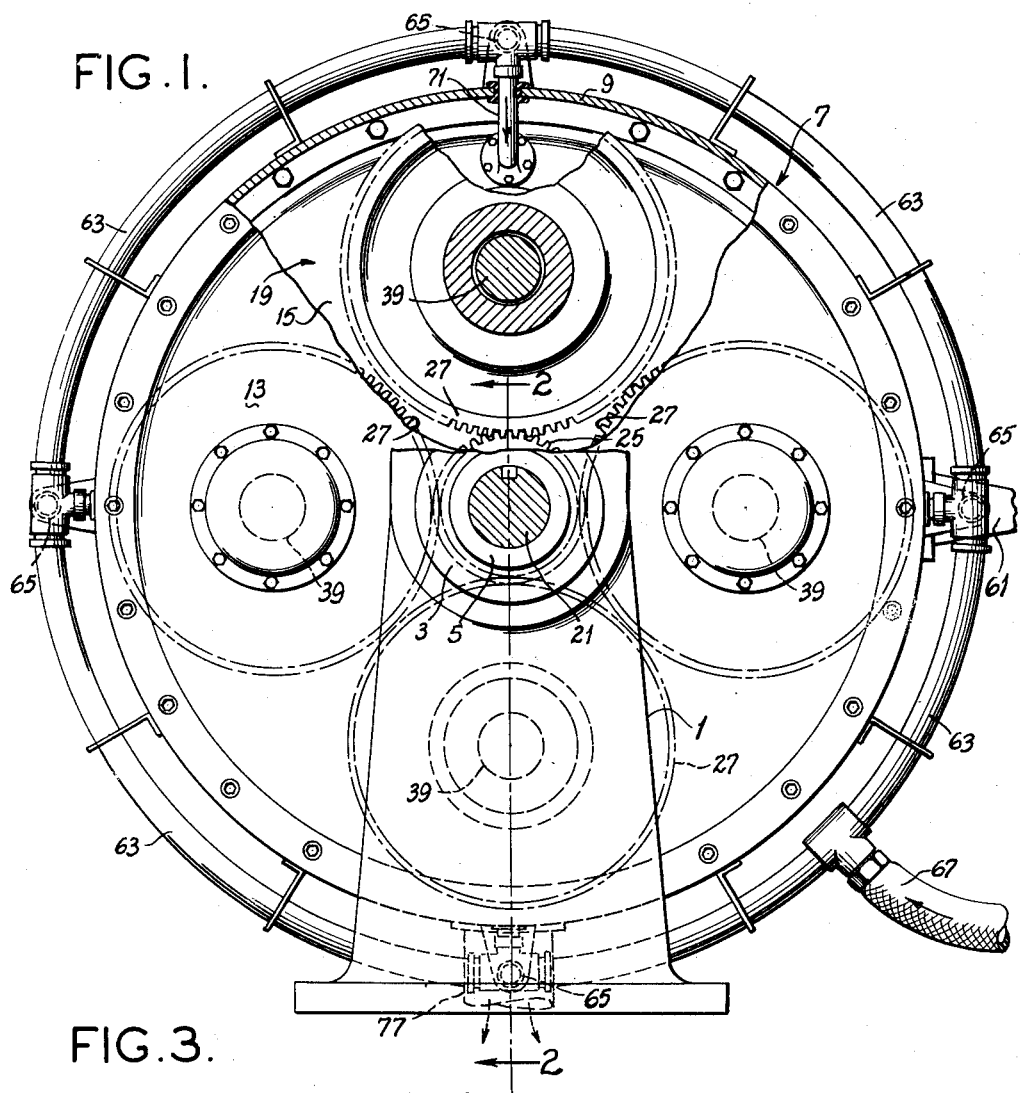
Figure 2:
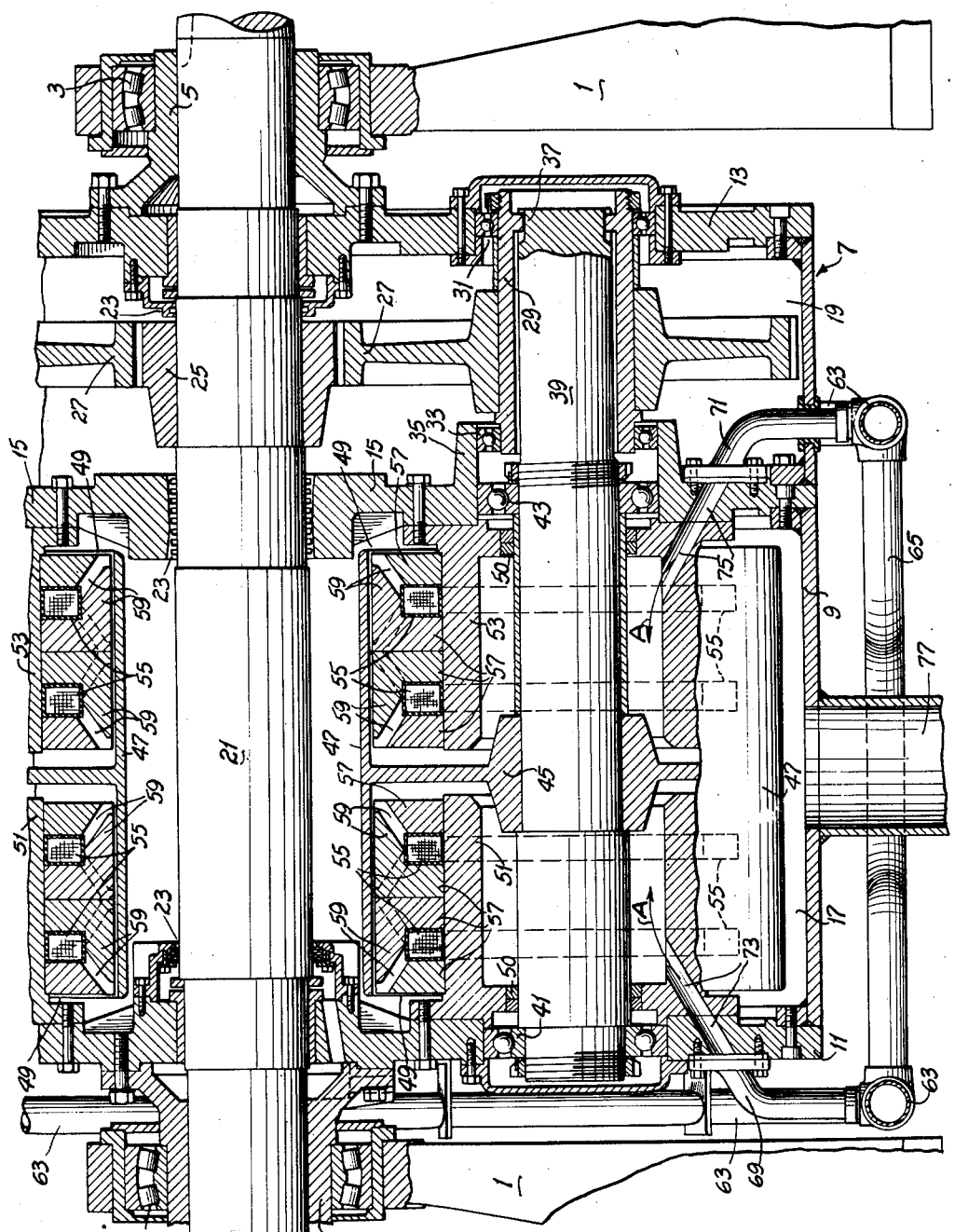
Fig. 2 is an enlarged vertical section taken on line 2—2 of Fig. 1.

Referring now more particularly to Figs. 1 and 2, there is shown a water-cooled dynamometer form of the invention in which numerals 1 indicate supporting pedestals in which are roller bearings 3 for sleeves 5 which support a carcass-forming cylinder or rotary supporting case 7. The case 7 is in detail made up of various parts but consists essentially of an outer drum 9 having end heads 11 and 13, the latter having the sleeves 5 fastened to them respectively. The above can more directly be seen from Fig. 3. In the drum 9, spaced from the head 13, is a dividing wall 15 which determines at the right a first gear compartment 19 and at the left a second compartment 17 for eddy-current torque apparatus to be described. The sleeves 5 form bearings for a drive shaft or main rotary member 21, the latter passing through both heads 11 and 13 and the wall 15. Suitable running sealing glands are provided at 23 for sealing up the compartments 17 and 19 (Fig. 2). All seals are for simplicity omitted from the Fig. 3 diagram. The shaft 21 has fastened to it a pinion gear 25 which may be referred to as a sun gear. Gear 25 meshes with a plurality (four in the present example) of gears 27. Gears 27 may be referred to as planetary, since the case 7 may rotate or rock in the bearings 3. Each gear 27 is fastened to a quill 29 supported in bearings 31 and 33. The bearings 31 are located in the head 13 and the bearings 33 are located in a boss 35 forming part of the wall 15.

Each quill 29, through a splined connection 37, is connected to an auxiliary rotary member constituted by a lay shaft or countershaft 39, the latter being supported in bearings 41 and 43 in the head 11 and wall 15, respectively. Thus it will be seen that rotary movement can be imparted from the shaft 21 through gears 25 and 27 to the four lay shafts 39 which rotate in the carcass 7. At the same time gears 27 have a planetary action around pinion 25 as the case 7 rocks or rotates.

Each lay shaft 39 has fastened to it a disc or spider 45 which forms a central support for an eddy-current inductor drum 47 composed of a ferrous material. Each drum extends in an opposite direction from its respective support 45, being open at its opposite ends 49. Extending telescopically into these opposite ends are ferrous hollow-supporting arbors 51 and 53, these being respectively attached to the head 11 and to the wall 15. Thus the arbors are stationary relative to the case 7 but movable therewith. They are provided with internal running seals 50 adjacent to shafts 39. These arbors support annular field coils 55, surrounded by ferrous rings 57, the latter having interdigitated ferrous poles 59 enveloping the coils adjacent to the drums 47. The members 51, 53, 57, 59 are magnetic, so that when an exciting current is passed through the coils 55, toroidal flux fields are generated, enveloping the coils and passing through the inductor drums 47. Therefore, if the drums 47 are rotated, as they may be from shaft 21 through gears 25 and 27, eddy currents are generated in the drums which induce reactive electromagnetic fields with respect to the fields from the poles 59. This applies torque to the field members 57, 59 which in turn is transmitted through the arbors 51 and 53 to the head 11 and wall 15 and thence to the case 7 as a whole. From the above it is evident that each drum with its arbor-supported field is an electromagnetic slip coupling which is effective between the drive shaft and the case. When the device is adapted as a dynamometer, the case 7 is provided with an exterior extension 61 (Fig. 1), the end of which is coupled to the usual linkage associated with a weighing scale for determining force. This obviously prevents unlimited rotation of the carcass, although it may swing or rock a few degrees in the bearings 3 in accordance with the motion required by the scales. Moreover, in the case of a dynamometer, substantial cooling is required to carry away the heat generated by the eddy currents in the drums 47. This is accomplished by mounting circulating water-conducting manifolds 63 on the outside of the case, these being interconnected as shown at 65. Water is introduced through a flexible hose 67. The manifolds include at intervals elbows 69 and 71. Each elbow 69 communicates with an opening 73 through the head 11 and an arbor 51. Each elbow 71 connects with an opening 75 passing through the wall 15 and an arbor 53. Thus water may be introduced into the arbors, as shown by the arrows A in Fig. 2. This water finds its way out through the ends of the arbors, being slung out centrifugally by the respective disc or spider 45, thence finding its way to the open ends 49 of the drums 47. During its passage, it moves between the poles 59 and the inner surfaces of the drums 47. It finally emerges into the compartment 17 and then escapes through a bottom drain opening 77. Suitable space is left in the floor supporting the device around the drain 77 to permit the swinging action abovementioned. The amount of water fed is controlled to carry away the heat at a proper rate, but no more water is used than necessary for this purpose so as to minimize hydraulic drag. As a general rule, in water-cooled eddy-current dynamometers the electrical coupling effect should predominate over any hydraulic coupling effect (the latter being considered to be parasitic) because the former is a steadier mode of absorbing energy, causing fewer oscillations on the scale readings obtained from the arm 61.

Operation is as follows, assuming use as a dynamometer:

A suitable prime mover to be tested is coupled to the shaft 21 by means of a suitable flange at its right-hand end. The shaft 21 drives the four shafts 39 through the pinion 25, four gears 27 and quills 29, respectively. The four shafts 39 in turn drive the four eddy-current inductor drums 47. Water is introduced as above described and the coils 55 are excited according to the load which it is desired to absorb. The detailed wiring for supplying current to the coils 55 is not shown, being well understood in the art. The resulting electromagnetic couplings between the drums 47 and arbors 51 and 53, respectively, result in the transmission of torque from the shaft 21 via four branches to the case 7, which tends to rotate oppositely to the rotation of the shaft 21.

It should be observed that the relationship between the field and inductor components of the invention may be reversed. For example, the field coils 55 and polar members 59 may be driven by the shafts 39 by attachment to members such as the drums 47, members such as the arbors 51 and 53 being then designed to become the inductors. This is a well-known inversion which is permissible by reason of the fact that only relative motion is required between an inductor and a field for producing electromagnetic reactive effects, regardless of whether the field or the inductor is stationary with respect to a third body. It is preferable however that the lighter inductor member be rotary, as disclosed, instead of the relatively heavier field members. It is also clear that if desired, the arbors 51 and 53 may be carried outside of the cylinders 47, either the cylinders or arbors constituting either field or inductor members, as desired.

Advantages of the invention will now be apparent. In the first place, the tooth contact loading between gears 25 and 27 is $$\frac{1}{n}$$

times the load for a single contact transmitting the same power where $n$ is the number of shafts used such as 39. The comparison here is with a tooth loading that would be necessary if an ordinary external speed reduction gear train were used between the prime mover and shaft 21 in a comparable single-rotor (nonplanetary) dynamometer. Moreover, the gears 25 and 27 are of the external type, which are less costly than the internal type gears which would be necessary if an external gear box were to be used for obtaining correspondingly low gear tooth loadings in the case of a single-rotor (nonplanetary) dynamometer. Another advantage is that for equal total dynamometer capacities, each of the multiple inductor drums 47 is of smaller diameter than would be a single drum built coaxially around shaft 21 as heretofore. Hence, the centrifugal forces are lower for a given speed of driver and, taking into further account the speed drop between pinion 25 and gears 27, very high speeds of the shaft 21 may be accommodated even under heavy loadings. In addition, a larger amount of heat may be abstracted for a given case diameter. This is because the amount of internal eddy-current heating surface that can be built into a number of the drums 47 (greater than two) is greater than the amount of heating surface that can be built into a single drum coaxial with shaft 21 (assuming machines of equal lengths and equal diameters). Hence, higher energy absorption rates may be accomplished with a given size of dynamometer made according to the principles stated herein.

Figure 3:
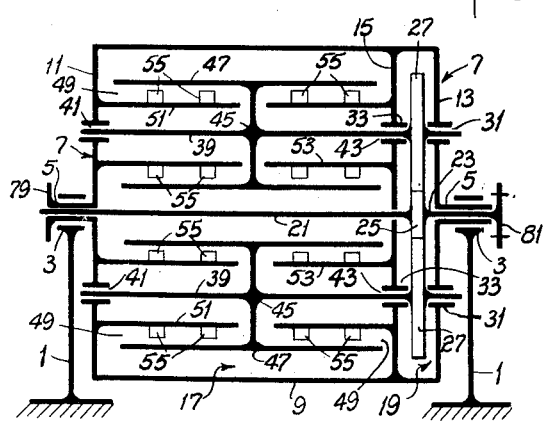
Fig. 3 is a diagrammatic section of the form of the invention shown in Figs. 1 and 2, but for clarity omitting a coolant circuit shown in said Figs. 1 and 2; and, Fig. 4 is a diagrammatic view showing a modification, coolant circuits being omitted.

As above indicated, in Fig. 3 the main elements of a machine such as shown in Figs. 1 and 2 are shown diagrammatically and provided with corresponding numbers. Certain details have been omitted, as for example, the various seals, the details of the splined connections between the gears 27 and shafts 39, bearing details, poles 59, water supply means, etc. The purpose of this figure is to show that the main parts of the invention are applicable also to form an eddy-current slip coupling, as well as a dynamometer. In such event, as indicated in Fig. 3, the left-hand sleeve 5 of the member 7 is provided with a coupling flange 79 for attachment to a member to be driven. The driving flange is shown at 81 on the right-hand end of shaft 21. Then by eliminating the water manifolds on the exterior of the case 7, the water outlet and the arm 61, what was a stationary case 7 may now rotate, with the result that kinetic energy may be transmitted through the device, instead of all energy being absorbed in heat. In this event, water cooling is usually not necessary, since the amount of slip between the poles 59 and drums 47 is much less at normal operating speeds than in the case of a dynamometer. The resulting smaller amount of heat may be dissipated by suitable air circulation, details of which need not be shown, being known. In this form of the invention, it will be understood that current may be brought to the coils 55 by suitable wiring, including slip rings and brushes, the details of which it will not be necessary to show inasmuch as such are common in dynamoelectric machinery. The operation is the same as in the case of the dynamometer already described, except that the case 7 is allowed to rotate through complete revolutions and to drive a driven member coupled at 79.

It is clear that when the apparatus is used as a transmission, the shaft such as 21 may be the driver and the casing 7 may be the driven member; or that the casing may be the driver and the shaft the driven member, depending upon whether a speed drop or increase is desired through the apparatus.

The number of shafts 39 to be employed is optional, but they should be spaced so as to provide a static and running balance around the center line of the shaft 21 and of course all rotary parts are to be dynamically balanced on their own axes of rotation. Such balance is easy to obtain, since most of the essential parts are of simple circular forms.

Figure 4:
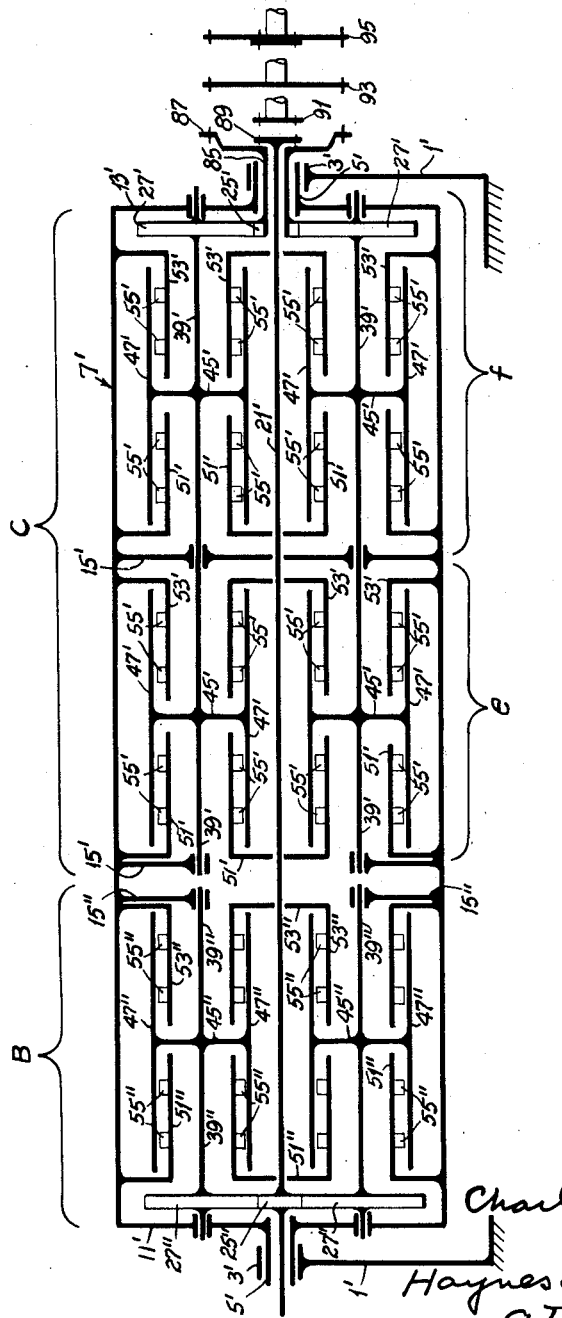

In Fig. 4 is shown another form of the invention primarily for dynamometer applications, although it also may be used as a transmission or slip coupling, if desired. In this modification, water connections for dynamometer operation have not been shown, since the provision of such would be obvious from the description already given. To avoid circumlocution, as many numerals as possible are used in connection with Fig. 4 which have already been used in connection with Figs. 1–3 (except that they are primed), to indicate analogously functioning parts. In this Fig. 4 form, the case 7' is considerably elongated to form two sections B and C, the heads 11' and 13' of which have the mounting sleeves 5' in bearings 3' of pedestals 1'. The shaft 21' passes through the case 7', being borne at the left end in one sleeve 5'. At the right end, it passes through the other sleeve 5' but is surrounded by a quill 85, which in this case carries the pinion 25'. The quill 85 is rotary in the adjacent sleeve 5'. The planetary gears 27' mesh with the pinion 25' and drive lay shafts 39' mounted for rotation in the case. These shafts 39' pass only through two subsections e and f of section C. Two walls 15' are used in section C to support the shafts 39'. Each shaft 39' has two spiders 45', each supporting an inductor drum 47'. Suitably fastened to the case 7' are arbors 51' and 53', related to the drums 47', as already noted. These carry the field coils 55' with which are associated the field poles (not illustrated in Fig. 4 because of the small scale of the drawing). It will thus be seen that by driving a flange 87 on the quill 85, the shafts 39' may be driven through the gear trains 25', 27', so as simultaneously to rotate the four inductor drums 47'. Thus the section C carries eight eddy-current drums instead of four, as in the form of the invention shown in Figs. 1, 2 and 3 and for equal sizes of parts will absorb or transmit twice the energy. Thus the capacity is about double for this section C.

Further capacity may be obtained from single section B, wherein drums 47'' are carried on spiders 45'' attached to lay shafts 39''. These shafts are borne between walls 15'' in the case 7' and its head 11'. The shafts carry planetary gears 27'' meshing with a central pinion 25'' carried on the shaft 21'. Arbors 51'' and 53'' are supported in the carcass 7' within the inductor drums 47''. These arbors carry the field coils 55'', the surrounding poles being again omitted from Fig. 4 for simplicity. A coupling flange 89 is provided at the right-hand end of the shaft 21', whereby gear 25'' (at the left) may be driven. Thus by attaching a prime mover only to the flange 89, the inductor drums 47'' may be driven through the gear trains 25'', 27'' and shafts 39''. By this means torque may be independently applied to the case 7' by means only of the four rotors in section B. For equal sizes of parts, the capacity of section B is one-half that of section C.

In view of the above, it will be seen that three modes of operation are possible in the Fig. 4 construction by providing three different cooperating flanges, such as shown diagrammatically at 91, 93 and 95. Thus if a prime mover is coupled only with flange 89 by means of flange 91, and the coils 55'' of section B excited, only section B will transmit torque to the case 7'. This is because flange 89 is connected through shaft 21' only with the drums 47'' through the gear trains 25'', 27''. The resulting capacity may be referred to as unit capacity supplied by the action of the four rotors 47'' in section B.

Or, the larger flange 93 may be employed and coupled only to flange 87 of quill 85. Thus shafts 39', driven from the quill 85 through the gear trains 25', 27', drive the eight rotors 47' in section C. Since each subsection e, f in section C is equal in capacity to the capacity of section B, the capacity of the machine is thus doubled over unity. It will be understood that under the two selective conditions already enumerated, when section B is electrically energized, section C is electrically deenergized, and when section C is energized, section B is deenergized.

Lastly, flange 95 may be selected for coupling the prime mover both to the flanges 87 and 89. Thus all of the drums 47' and 47'' in sections C and B are rotated through the respective gear trains 25', 27' and 25'', 27''. Hence the capacity of the machine is tripled over unity, assuming all of the coils 55' and 55'' to be excited. It is to be understood that in the apparatus of Fig. 4, when used as a dynamometer (case 1' swingable but stationary), a water-cooling arrangement is used analogous to that already described in connection with Figs. 1 and 2. If it is desired to use the device as a power transmission or slip coupling, the left-hand sleeve 5' is coupled to the device to be driven and the water cooling feature omitted; also the scale connections.

In view of the above, it will be seen that in addition to the advantages already discussed, this type of machine is readily constructed to have a wide range of selective capacities, without sacrifice of desired torque characteristics. This is because each section, by selective manipulation, is not called upon to operate under extremely low or high loads. If the loading is light, section B only may be used; if it is intermediate, section C only may be used; if it is maximum, both sections B and C may be used. Thus each section is always operating under best matched load conditions.

Another varition is to operate the Fig. 2 form with the fields deenergized but allowing more water to flow. The operation would then be entirely that of a hydraulic dynamometer.

The appended claims are intended to cover the above equivalents and others that may be thought of.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A dynamometer comprising a rocking case having end bearings, a central rotary shaft passing through at least one of said end bearings, rotary countershafts in the case, said case being divided to form a first gear compartment and a second compartment, gear trains in the first compartment connecting the central shaft with the countershafts, inductor cylinders in the second compartment respectively connected with the countershafts, and pairs of open-ended arbors respectively coaxial with the countershafts and connected to opposite ends of the second compartment and extending into said inductor cylinders, said arbors comprising electromagnetic field members located within the inductor cylinders, said second compartment comprising a container for coolant and having an outlet, and channels carried on the rocking case for introducing coolant into said arbors for subsequent movement from their open ends against the interiors of said cylinders and escape from their ends through the second compartment to said outlet.

2. Torque-transmitting apparatus comprising a rotary case, a first and a second rotary driving member each coaxial with the case and with each other, a first number of countershafts rotary in the case and geared to said first driving member, a second number of countershafts rotary in the case and geared to the second driving member, the two groups of countershafts being independently rotary, two groups of unequal numbers of devices consisting of electric-field members and related inductor members, the field members of both groups being attached to the case, the inductor members of one group being respectively attached to said first countershafts and the inductor members of the other group being respectively attached to said second countershafts, and coupling means for attaching a driving device either to the first driving member or the second driving member or both.

3. A dynamometer comprising a rocking case, a first and a second rotary driving member each coaxial with the case and with each other, a first number of countershafts rotary in the case and geared to said first driving member, a second number of countershafts rotary in the case and geared to the second driving member, the two groups of countershafts being independently rotary, two groups of unequal numbers of devices consisting of electric-field members and related inductor members, the field members of both groups being attached to the case, the inductor members of one group being respectively attached to said first countershafts and the inductor members of the other group being respectively attached to said second countershafts, coupling means for attaching a driving device either to the first driving member or the second driving member or both, and liquid-coolant inlet means in the case adapted to introduce coolant therein and to direct it for circulation between said electric-field and inductor members.

4. A dynamometer comprising a rocking case, a driving member coaxial with the case, a number of countershafts rotary in the case and geared to said driving member, devices consisting of electric-field and related inductor members, the field members thereof being attached to the case and the inductor members thereof being attached to the countershafts, and liquid-coolant inlet means in the case adapted to introduce coolant therein for circulation first between said electric-field and inductor members and then into the case to an outlet therein.

CHARLES T. HAYES.

REFERENCES CITED

The following references are of record in the file of this patent:

UNITED STATES PATENTS

| Number | Name | Date |
|---|---|---|
| 945,398 | King | Jan. 4, 1910 |
| 2,174,662 | Josephs | Oct. 3, 1939 |
| 2,419,837 | Hugin | Apr. 29, 1947 |